(12) United States Patent
Kukielka et al.

(10) Patent No.: US 10,793,103 B2
(45) Date of Patent: Oct. 6, 2020

(54) SUPPLEMENTAL DEVICE FOR USE WITH A VEHICLE SAFETY BELT AND METHODS OF USING SAME

(71) Applicants: Robert Kukielka, Fleetwood, PA (US); Maciej Luczak, Zielonki Parcele (PL); Norbert Galuszewski, Borzecin Maly (PL)

(72) Inventors: Robert Kukielka, Fleetwood, PA (US); Maciej Luczak, Zielonki Parcele (PL); Norbert Galuszewski, Borzecin Maly (PL)

(*) Notice: Subject to any disclaimer, the term of this patent is extended or adjusted under 35 U.S.C. 154(b) by 0 days.

(21) Appl. No.: 16/159,623

(22) Filed: Oct. 13, 2018

(65) Prior Publication Data

US 2019/0111887 A1    Apr. 18, 2019

Related U.S. Application Data

(63) Continuation-in-part of application No. 62/572,491, filed on Oct. 15, 2017.

(51) Int. Cl.
*B60R 22/30* (2006.01)
*B60R 22/26* (2006.01)
*B60R 22/12* (2006.01)
*B60R 22/02* (2006.01)

(52) U.S. Cl.
CPC ............ *B60R 22/30* (2013.01); *B60R 22/024* (2013.01); *B60R 22/12* (2013.01); *B60R 22/26* (2013.01)

(58) Field of Classification Search
CPC .......... B60R 22/30; B60R 2/024; B60R 22/12; B60R 22/26
See application file for complete search history.

(56) References Cited

U.S. PATENT DOCUMENTS

| | | | |
|---|---|---|---|
| 4,063,778 A | 12/1977 | Chika | |
| 4,243,266 A | 1/1981 | Anderson | |
| 4,832,367 A * | 5/1989 | Lisenby | B60R 22/024 24/265 R |
| 4,840,404 A | 6/1989 | Falterman | |
| 4,946,198 A * | 8/1990 | Pittore | B60R 22/024 280/808 |
| 5,169,174 A * | 12/1992 | Gray | B60R 22/024 280/801.2 |
| 5,472,236 A * | 12/1995 | Gray | B60R 22/024 280/808 |
| 5,570,933 A * | 11/1996 | Rouhana | B60R 22/023 297/468 |

(Continued)

*Primary Examiner* — Philip F Gabler
(74) *Attorney, Agent, or Firm* — James R. McDaniel

(57) ABSTRACT

A method of using a vehicle restraint device, including a vehicle safety belt having an adjustable safety belt connected to a vehicle seat such that a first end of the safety belt is connected to a seat belt anchor and a second end of the safety belt is connected to an upper seat portion, a strap extension having a lower attachment device connected to a first end of the extension such that the lower attachment device is located between the seat belt anchor and a hip area of the end user and an upper attachment device is connected to a second end of the extension, wherein the lower and upper attachment devices are located on the extension in an orientation that is substantially parallel to the safety belt and the lower attachment device and the upper attachment device allow the extension to be removed from the safety belt.

14 Claims, 9 Drawing Sheets

(56) References Cited

U.S. PATENT DOCUMENTS

| | | | | |
|---|---|---|---|---|
| 5,605,380 | A | * | 2/1997 | Gerstenberger ...... B60R 22/024 24/170 |
| 5,839,792 | A | * | 11/1998 | Baik .................... B60R 22/024 297/483 |
| 5,915,335 | A | | 6/1999 | Holt, Jr. |
| 6,174,032 | B1 | * | 1/2001 | Conaway ............... B60N 2/265 297/483 |
| 6,203,110 | B1 | * | 3/2001 | Proteau ................ B60R 22/024 297/482 |
| 6,322,149 | B1 | * | 11/2001 | Conforti ............... B60R 22/024 297/482 |
| 6,676,219 | B1 | | 1/2004 | Brewer |
| 7,445,245 | B2 | * | 11/2008 | Beczkowski ........... B60R 22/00 280/801.1 |
| 7,703,806 | B2 | * | 4/2010 | Bell ..................... B60R 22/024 280/801.1 |
| 9,376,088 | B2 | * | 6/2016 | Sumroy ................ B60R 22/105 |
| 2016/0144823 | A1 | | 5/2016 | Williams |

* cited by examiner

SUPPLEMENTAL DEVICE FOR USE WITH A VEHICLE SAFETY BELT AND METHODS OF USING SAME

CROSS-REFERENCE TO RELATED APPLICATIONS

This application is a continuation-in-part of U.S. Patent Application 62/572,491, filed on Oct. 15, 2017, the disclosure of which is hereby incorporated by reference in its entirety to provide continuity of disclosure to the extent such a disclosure is not inconsistent with the disclosure herein.

FIELD OF THE INVENTION

The present invention is generally related to a supplemental device for use with a vehicle safety belt and the method of using the supplemental device with the vehicle safety belt. More particularly, the supplemental device utilizes two (2) points of attachment to the existing vehicle safety belt such that the points of attachment are removably secured to the existing vehicle safety belt in an orientation that is parallel to the existing vehicle safety belt. Secondly, the points of attachment are buckles that can be removably secured to the existing vehicle safety belt. Thirdly, the lower one of the points of attachment should be located behind and away from hips of the end user and as close to the seat cushion and seat belt anchor, as possible, in order to prevent any unnecessary movement of the lap belt above the end user's pelvis/hips and towards the abdomen of the end user. Fourthly, the upper one of the points of attachment includes a magnet that allows the end user to attach the loose end of the existing vehicle safety belt to the upper point of attachment so that the loose end, of the existing safety belt is not damaged or becomes tangled with the other existing vehicle safety belts located in the vehicle. Fifthly, the supplemental device includes a strap extension that includes markings or other indicia that allows the end user to easily adjust a length of the strap extension to a pre-determined length if the supplemental device has been adjusted for a different user or removed from the existing safety belt. Sixthly, the existing vehicle safety belt is provided with markings or other indicia that allows the end user to easily re-attach the upper one of the points of attachment to the existing vehicle safety belt at a pre-determined location along the existing vehicle safety belt if the supplemental device has been removed from the existing vehicle safety belt. Finally, the buckles include a unique strap extension retainer that securely retains the strap extension within the buckle.

BACKGROUND OF THE INVENTION

Prior to the present invention, as set forth in general terms above and more specifically below, it is known to employ various types of supplemental devices for use with existing vehicle safety belts. See for example, U.S. Pat. No. 4,063,778 by Chika, U.S. Pat. No. 4,243,266 by Anderson, U.S. Pat. No. 4,840,404 by Falterman, U.S. Pat. No. 5,169,174 by Gray, U.S. Pat. No. 5,839,792 by Baik, U.S. Pat. No. 5,915,335 by Holt, Jr., U.S. Pat. No. 6,676,219 by Brewer, U.S. Pat. No. 7,703,806 by Bell et al., U.S. Pat. No. 9,376,088 by Sumroy, U.S. Patent Application 2016/0144823 by Williams, PCT Application WO/93/21044 by Chollet, and EPO Patent 2,719,576 by Tribus B. V.

While these various supplemental devices for use with existing vehicle safety belts may have been generally satisfactory, there is nevertheless a need for a new and improved supplemental device for use with existing vehicle safety belts that utilizes two (2) points of attachment to the existing vehicle safety belt such that the points of attachment are removably secured to the existing vehicle safety belt in an orientation that is parallel to the existing vehicle safety belt, the points of attachment are buckles that can be removably secured to the existing vehicle safety belt, the lower one of the points of attachment should be located behind and away from hips of the end user and as close to the seat cushion and seat belt anchor, as possible, in order to prevent any unnecessary movement of the lap belt above the end users pelvis/hips and towards the abdomen of the end user, the upper one of the points of attachment includes a magnet that allows the end user to attach the loose end of the existing vehicle safety belt to the upper point of attachment so that the loose end of the existing safety belt is not damaged or becomes tangled with the other existing vehicle safety belts located in the vehicle, the supplemental device includes a strap extension that includes markings or other indicia that allows the end user to easily adjust a length of the strap extension to a pre-determined length if the supplemental device has been adjusted for a different user or removed from the existing safety belt, the existing vehicle safety belt is provided with markings or other indicia that allows the end user to easily re-attach the upper one of the points of attachment to the existing vehicle safety belt at a pre-determined location along the existing vehicle safety belt if the supplemental device has been removed from the existing vehicle safety belt, and the points of attachment are buckles which include a unique strap extension retainer that securely retains the strap extension within the buckle.

It is a purpose of this invention to fulfill these and other needs in the supplemental devices for use with existing vehicle safety belts art in a manner more apparent to the skilled artisan once given the following disclosure.

BRIEF SUMMARY OF THE INVENTION

A first aspect of the present invention is a supplemental device for use with a vehicle safety belt system, including a vehicle safety belt system having an adjustable safety belt operatively connected to a vehicle seat such that a first end of the adjustable safety belt is operatively connected to a seat belt anchor located adjacent to a lower portion of the vehicle seat and a second end of the adjustable safety belt is adjustably connected to an upper portion of the vehicle seat, wherein a length of the second end of the adjustable safety belt can be adjusted and wherein a vehicle safety belt latch is located between the first and second ends of the adjustable safety belt such that the vehicle safety belt latch is capable of being operatively connected to a vehicle seat latch in order to secure an end user to the vehicle seat, a strap extension having a first end and a second end; a lower attachment device operatively connected to the first end of the strap extension such that the lower attachment device is located between the seat belt anchor and hips of the end user and an upper attachment device operatively connected to the second end of the strap extension, wherein the lower attachment device and the upper attachment device are located on the strap extension in an orientation that is substantially parallel to the adjustable safety belt and the lower attachment device and the upper attachment device allow the strap extension to be removed from the adjustable safety belt, and strap adjustment indicia located along a portion of the strap extension.

In one embodiment of the first aspect of the present invention, the adjustable safety belt further includes vehicle safety belt indicia located along a length of the vehicle safety belt and adjacent to the second end of the adjustable safety belt.

In another embodiment of the first aspect of the present invention, the strap extension further includes a strap adjuster operatively connected to the strap extension and located between the first and second ends of the strap extension.

In a further embodiment of the first aspect of the present invention, the lower and upper attachment devices further include a base having a first end and a second end, wherein the second end includes a latch opening, a pivot operatively connected to the first end of the base, an upper latch device having a first end and a second end such that the first end of the upper latch device is operatively connected to the pivot, wherein the upper latch device includes a latch operatively connected to the second end of the upper latch device such that the latch is capable of latching with the latch opening in the base, and a magnet located along a portion of the upper latch device.

In still another embodiment of the first aspect of the present invention, the lower and upper attachment devices further include a base having a first end and a second end, wherein the base includes a latch operatively connected to the second end of the base, a pivot operatively connected to the first end of the base, an upper latch device having a first end and a second end such that the first end of the upper latch is operatively connected to the pivot, and a magnet located along a portion of the upper latch device.

In a still further embodiment of the first aspect of the present invention, the upper attachment device further includes a slot located in the base, and a bar located substantially within the slot.

In a yet another embodiment of the first aspect of the present invention, the lower and upper attachment devices further include a center bar, a first connector operatively connected on one side of the center bar and a second connector operatively connected on another side of the center bar, a first bar extension operatively connected to the first connector and a second bar extension operatively connected to the second connector, a first connector opening located between the first connector and the center bar and a second connector opening located between the second connector and the center bar, and a first extension opening located between the first connector and the first bar extension and a second extension opening located between the second connector and the second bar extension.

A second aspect of the present invention is a vehicle safety belt restraint system, including a vehicle safety belt system having an adjustable safety belt operatively connected to a vehicle seat such that a first end of the adjustable safety belt is operatively connected to a seat belt anchor located adjacent to a lower portion of the vehicle seat and a second end of the adjustable safety belt is adjustably connected to an upper portion of the vehicle seat, wherein a length of the second end of the adjustable safety belt can be adjusted and wherein a vehicle safety belt latch is located between the first and second ends of the adjustable safety belt such that the vehicle safety belt latch is capable of being operatively connected to a vehicle seat latch in order to secure an end user to the vehicle seat, a strap extension having a first end and a second end; a lower attachment device operatively connected to the first end of the strap extension such that the lower attachment device is located between the seat belt anchor and hips of the end user and an upper attachment device operatively connected to the second end of the strap extension, wherein the lower attachment device and the upper attachment device are located on the strap extension in an orientation that is substantially parallel to the adjustable safety belt and the lower attachment device and the upper attachment device allow the strap extension to be removed from the adjustable safety belt and strap adjustment indicia located along a portion of the strap extension.

In one embodiment of the second aspect of the present invention, the adjustable safety belt further includes vehicle safety belt indicia located along a length of the vehicle safety belt and adjacent to the second end of the adjustable safety belt.

In another embodiment of the second aspect of the present invention, the strap extension further includes a strap adjuster operatively connected to the strap extension and located between the first and second ends of the strap extension.

In a still another embodiment of the second aspect of the present invention, the lower and upper attachment devices further include a base having a first end and a second end, wherein the second end includes a latch opening, a pivot operatively connected to the first end of the base, an upper latch device having a first end and a second end such that the first end of the upper latch device is operatively connected to the pivot, wherein the upper latch device includes a latch operatively connected to the second end of the upper latch device such that the latch is capable of latching with the latch opening in the base, and a magnet located along a portion of the upper latch device.

In a further embodiment of the second aspect of the present invention, the lower and upper attachment devices further include a base having a first end and a second end, wherein the base includes a latch operatively connected to the second end of the base, a pivot operatively connected to the first end of the base, an upper latch device having a first end and a second end such that the first end of the upper latch is operatively connected to the pivot, and a magnet located along a portion of the upper latch device.

In a yet another embodiment of the second aspect of the present invention, the upper attachment device further includes a slot located in the base, and a bar located substantially within the slot.

A third aspect of the present invention is a method of using a supplemental device with a vehicle safety belt system, including the steps of: providing a vehicle safety belt system having an adjustable safety belt operatively connected to a vehicle seat such that a first end of the adjustable safety belt is operatively connected to a seat belt anchor located adjacent to a lower portion of the vehicle seat and a second end of the adjustable safety belt is adjustably connected to an upper portion of the vehicle seat, wherein a length of the second end of the adjustable safety belt can be adjusted and wherein a vehicle safety belt latch is located between the first and second ends of the adjustable safety belt such that the vehicle safety belt latch is capable of being operatively connected to a vehicle seat latch in order to secure an end user to the vehicle seat, a strap extension having a first end and a second end; a lower attachment device operatively connected to the first end of the strap extension such that the lower attachment device is located between the seat belt anchor and hips of the end user and an upper attachment device operatively connected to the second end of the strap extension, wherein the lower attachment device and the upper attachment device are located on the strap extension in an orientation that is substantially parallel to the adjustable safety belt and the lower attachment device and the upper attachment device allow the strap extension to be removed from the adjustable safety belt; and providing strap adjustment indicia located along a portion of the strap extension.

In one embodiment of the third aspect of the present invention, the step of providing an adjustable safety belt further includes the step of locating vehicle safety belt indicia along a length of the vehicle safety belt and adjacent to the second end of the adjustable safety belt.

In another embodiment of the third aspect of the present invention, the step of providing a strap extension further includes the step of providing a strap adjuster that is operatively connected to the strap extension and located between the first and second ends of the strap extension.

In a further embodiment of the third aspect of the present invention, the step of providing the lower and upper attachment devices further includes the steps of providing a base having a first end and a second end, wherein the second end includes a latch opening, providing a pivot that is operatively connected to the first end of the base, providing an upper latch device having a first end and a second end such that the first end of the upper latch device is operatively connected to the pivot, wherein the upper latch device includes a latch operatively connected to the second end of the upper latch device such that the latch is capable of latching with the latch opening in the base, and providing a magnet located along a portion of the upper latch device.

In still another embodiment of the third aspect of the present invention, the method further includes the steps of determining a location of the lower and upper attachment devices, locating the upper attachment device adjacent to the second end of the adjustable safety belt and the vehicle safety belt indicia, noting the location of the upper attachment device with respect to the vehicle safety belt indicia, and removably attaching the lower and upper attachment devices to the adjustable safety belt such that the lower and attachment device is located adjacent to the seat belt anchor.

In a still further embodiment of the third aspect of the present invention, the method further includes the steps of adjusting the strap extension to a desired length of the strap extension through the use of the strap adjuster, noting a location of the strap adjuster along the strap extension with respect to the strap adjustment indicia, and removably attaching the vehicle safety belt latch to the vehicle seat latch.

In a yet another embodiment of the third aspect of the present invention, the method further includes the steps of removing the vehicle safety belt latch from the vehicle seat latch, and removably attaching the vehicle safety belt latch to the magnet located along a portion of the upper latch device in order to keep the strap extension, the upper and lower attachment devices and the adjustable safety belt from getting damaged or tangled.

The preferred supplemental devices for use with existing vehicle safety belts, according to various embodiments of the present invention, offers the following advantages: ease of use; lightness in weight; durability; improved safety belt characteristics; the ability to attach the loose end of the existing vehicle safety belt to the upper point of attachment so that the loose end of the existing safety belt is not damaged or does not become tangled with the other existing vehicle safety belts located in the vehicle; the use of buckles that can be removably secured to the existing vehicle safety belt; the use of a strap extension that includes markings or other indicia that allows the end user to easily adjust a length of the strap extension to a pre-determined length if the supplemental device has been adjusted for a different user or removed from the existing safety belt; the use of markings or other indicia on the existing vehicle safety belt that allow the end user to easily re-attach the upper one of the points of attachment to the existing vehicle safety belt at a pre-determined location along the existing vehicle safety belt if the supplemental device has been removed from the existing vehicle safety belt; and the use of a unique strap extension retainer that securely retains the strap extension within the buckle. In fact, in many of the preferred embodiments, these advantages are optimized to an extent that is considerably higher than heretofore achieved in prior, known supplemental devices for use with existing vehicle safety belts.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

Figure 1:
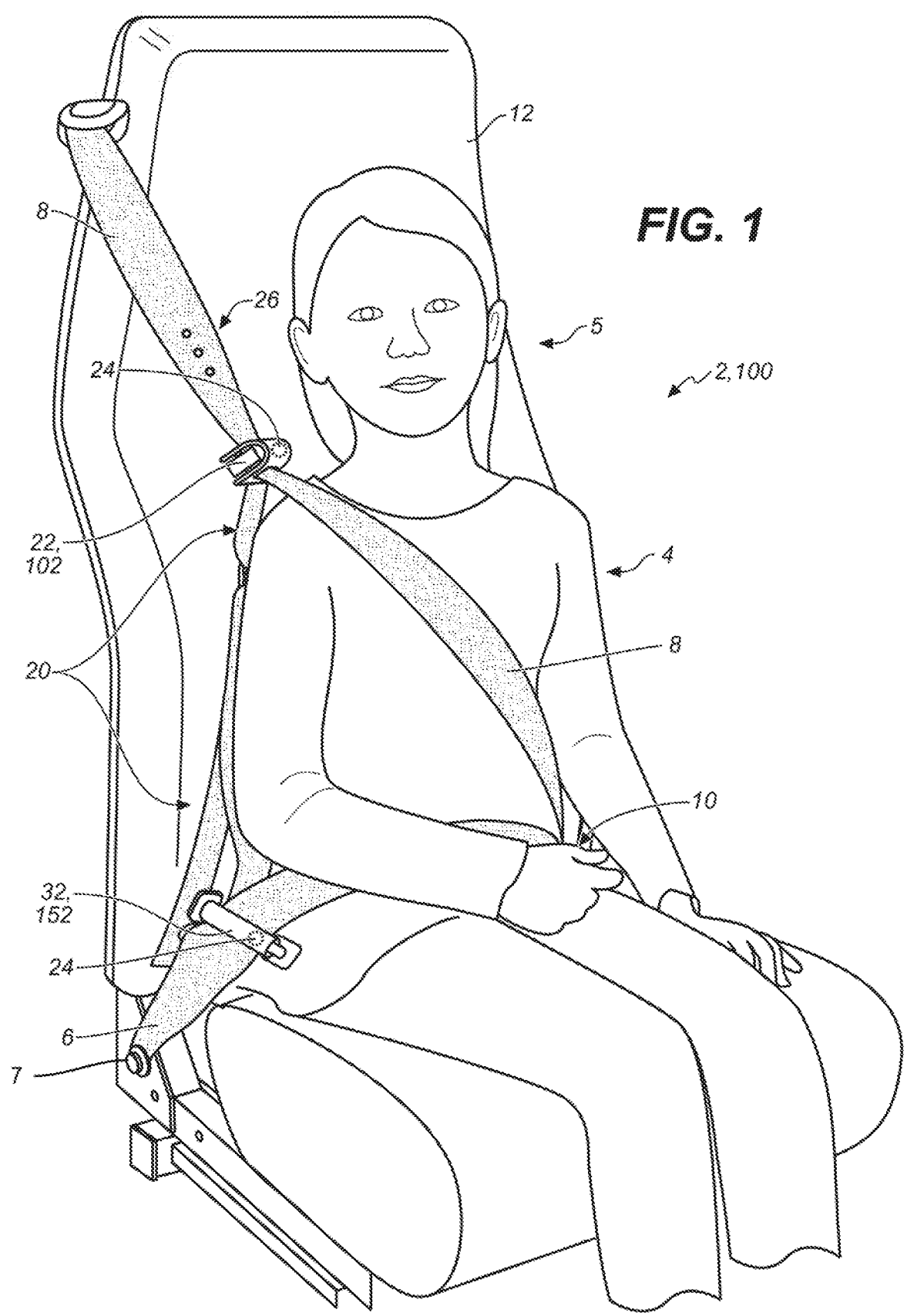
FIG. 1 is schematic illustration of the supplemental device for use with an existing vehicle safety belt, constructed according to one embodiment of the present invention.

Referring now to FIG. 1 there is illustrated supplemental device 2 for use with an existing, vehicle safety belt 4. As will be explained hereinafter in greater detail, the supplemental device 2 utilizes two (2) points of attachment to the existing vehicle safety belt 4 such that the points of attachment are removably secured to the existing vehicle safety belt in an orientation that is parallel to the existing vehicle safety belt, the points of attachment are buckles that can be removably secured to the existing vehicle safety belt, the lower one of the points of attachment should be located behind and away from hips of the end user and as close to the seat cushion and seat belt anchor, as possible, in order to prevent any unnecessary movement of the lap belt above the end user's pelvis/hips and towards the abdomen of the end user, the upper one of the points of attachment includes a magnet that allows the end user to attach the loose end of the existing vehicle safety belt to the upper point of attachment so that the loose end of the existing safety belt is not damaged or becomes tangled with the other existing vehicle safety belts located in the vehicle, the supplemental device includes a strap extension that has markings or other indicia that allow the end user to easily adjust a length of the strap extension to a pre-determined length if the supplemental device has been adjusted for a different user or removed from the existing safety belt, the existing vehicle safety belt is provided with markings or other indicia that allow the end user to easily re-attach the upper one of the points of attachment to the existing vehicle safety belt at a pre-determined location along the existing vehicle safety belt if the supplemental device has been removed from the existing vehicle safety belt, and the points of attachment are buckles which include a unique strap extension retainer that securely retains the strap extension within the buckle.

As, shown in FIG. 1, supplemental device 2 for use with an existing vehicle safety belt 4 includes, in part, end user 5, existing vehicle safety belt straps 6, 8, seat belt anchor 7, existing vehicle safety belt latch or fastener 10, strap extension 20, upper supplemental point of attachment 22, lower supplemental point of attachment 32 and magnet 24. It is to be understood that end user 5, typically, is a child but the supplemental device 2 for use with an existing vehicle safety belt 4 can also be utilized by an adult.

With respect to existing vehicle safety belt straps 6, 8, seat belt anchor 7, and existing vehicle safety belt latch or fastener 10, these components are usually found on conventional vehicle safety restraint systems. As is well known in the vehicle safety belts, the end user sits in the vehicle seat 12, grabs the vehicle safety belt latch or fastener 10, pulls the vehicle safety belt latch or fastener 10 along with a portion of the existing vehicle safety belt straps 6, 8 away from seat belt anchor 7 and across the end user's body and attaches the existing vehicle safety belt latch or fastener 10 into a buckle or other conventional attachment device (not shown) in order to assist in restraining the end user in case of a vehicle accident or sudden stop.

A unique aspect of the present invention is the use of indicia 26 located along a length of existing vehicle safety belt strap 8 (FIG. 1). Preferably, indicia 26 are any suitable markings such as dots or other similar markings that can be used to locate upper supplemental point of attachment 22 along existing vehicle safety belt strap 8. In this manner, the location of upper supplemental point of attachment 22 on existing vehicle safety belt strap 8 can be noted so that if the supplemental device 2 is to be used on a child who is taller (or shorter), the location of upper supplemental point of attachment 22 can be adjusted to fit that taller/shorter child or attachment 22 has to be removed to fit grown up person or moved to other vehicle. If the strap extension 20 has to be re-adjusted to fit the original child, the parent simply has to remember which of the indicia 26 were used to denote the location of upper supplemental point of attachment 22 for the original child and simply attach the upper supplemental point of attachment 22 at the previously denoted location on indicia 26 on existing vehicle safety belt strap 8. Consequently, the parent does not have to determine again the appropriate location of supplemental point of attachment 22 on existing vehicle safety belt strap 8 in order to fit the original child.

Figure 2:
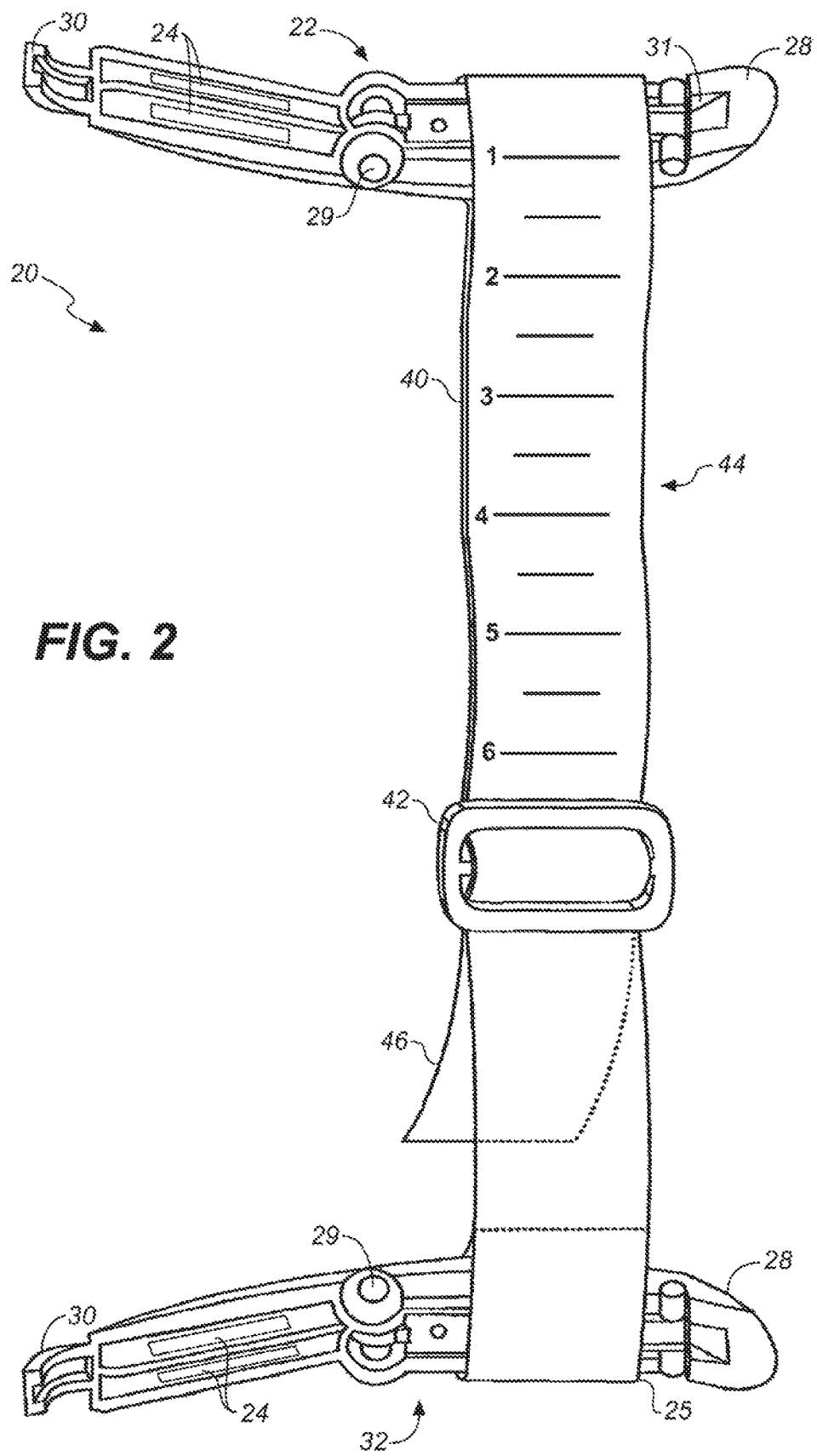
FIG. 2 is a schematic illustration of the supplemental device, constructed according to the present invention.

Regarding strap extension 20, as shown in FIG. 2, strap extension 20 includes, in part upper supplemental point of attachment 22, lower supplemental point of attachment 32, strap loop 25, strap 40, strap adjuster 42, strap adjustment indicia 44 and strap end 46. Preferably, strap 40 is constructed of the same durable, high strength material as existing vehicle safety belt straps 6, 8. Also, strap loop 25 is conventionally formed on strap 40 by locating a portion of strap 40 around lower supplemental point of attachment 32 and sewing or otherwise permanently securing strap 40 to lower supplemental point of attachment 32 in order to permanently retain strap 40 on lower supplemental point of attachment 32. Furthermore, strap 40 is conventionally looped over upper supplemental point of attachment 22. As will be discussed in greater detail later, the end user simply has to hold onto strap adjuster 42 and then pull on strap end 46 which will cause a portion of strap 40 to move up and over upper supplemental point of attachment 22 which, in turn, causes the length of strap 40 to be adjusted. It is to be further understood that strap extension 20 is to be located behind the torso the end user 5. In this manner, upper supplemental point of attachment 22 is to be, located behind and slightly above the shoulders of the end user 5 and lower supplemental point of attachment 32 is to be located behind and below the hips of the end user 5.

A unique inventive aspect of the present invention is the use of strap adjustment indicia 44. As can be seen in FIG. 2, strap adjustment indicia 44 are located along a portion of strap 40. In this manner, the length of strap extension 20 can be noted so that if the supplemental device 2 is to be used on a child who is taller (or shorter), the length of the strap extension 20 can be adjusted to fit that taller/shorter child. If the strap extension 20 has to be re-adjusted to fit the original child, the parent simply has to remember which of the indicia 44 were used to denote the length of the strap extension 20 for the original child and simply adjust the location of the strap adjuster 42 to that original location of the strap adjuster 42 on strap indicia 44. Consequently, the parent does not have to spend an excessive amount of time re-adjusting the length of the strap extension 20 to fit the original child.

Figure 3:
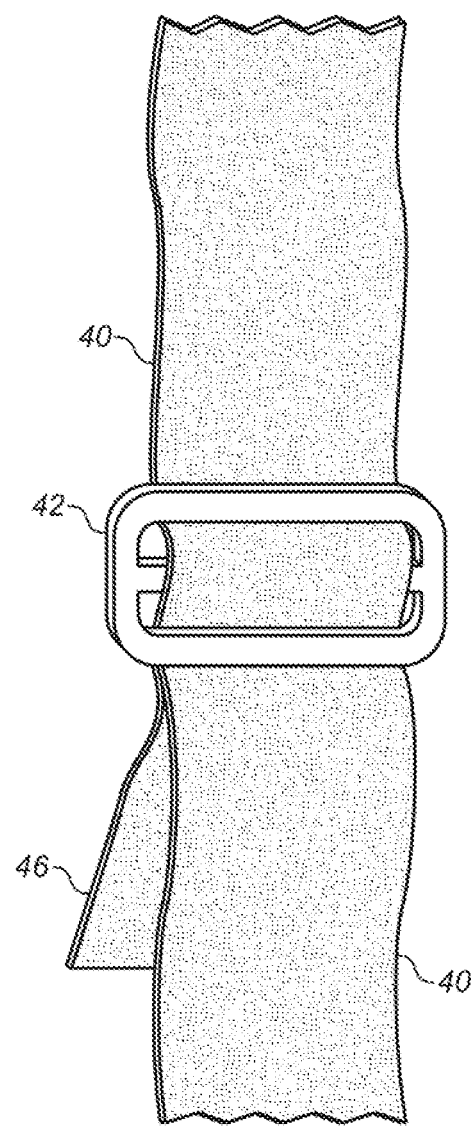
FIG. 3 is a schematic illustration of a strap extension adjustment device, constructed according to the present invention.
Figure 4:
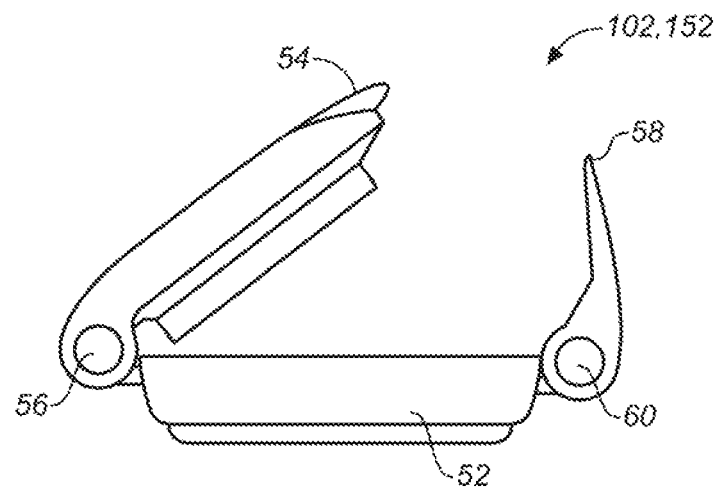
FIG. 4 is a schematic side view of a point of attachment buckle, constructed according to a second embodiment of the present invention.

With respect to strap adjuster 42, as shown in FIG. 3, strap adjuster 42 is a conventional strap adjusting device that can be used with strap 40 in order to conventionally adjust a length of strap 40 by pulling on strap end 46. Preferably, strap adjuster 42 is constructed of any suitable, durable, lightweight material such as metal or plastic. As previously discussed, the end user 5 can simply hold onto strap adjuster 42 and pull on strap end 46 which causes a portion of strap 40 to move up and over upper supplemental point of attachment 22 which, in turn, causes the length, of strap 40 to be adjusted.

Regarding upper and lower supplemental points of attachment 22, 32, as shown in FIGS. 1, 2 and 4-8, upper and lower supplemental points of attachment 22, 32 are used to retain the strap extension 20 on existing vehicle safety belt straps 6, 8, respectively, in a direction that is parallel to existing vehicle safety belt straps 6, 8. Another unique inventive aspect of the present invention is that upper and lower supplemental points of attachment 22, 32 are located on existing vehicle safety belt straps 8, 6, respectively, in a direction that is parallel to existing vehicle safety belt straps 8, 6 in order to provide maximum end user restraining capabilities of supplemental device 2 when strap extension 20 is attached to existing vehicle safety belt straps 6, 8.

With respect to the construction of upper and lower supplemental points of attachment 22, 32, upper and lower supplemental points of attachment 22, 32 include, in part, base 28, pivot 29, latch 30 and latch opening 31 located in base 28. In this manner, strap 40 can be placed around base 28, latch 30 is pivoted around pivot 29 so that latch 30 interacts with latch opening 31 and latch 30 is then pushed into or otherwise interacts with latch opening 31 in order to releasably retain latch 30 within latch opening 31. The latching of latch 30 to latch opening 31 causes the strap 40 (for upper supplemental point of attachment 22) and strap loop 25 (for lower supplemental points of attachment 32) to be retained within upper and lower supplemental points of attachment 22, 32, respectively. Preferably, upper and lower supplemental points of attachment 22, 32 are constructed of any suitable, durable, high strength, lightweight material such as plastic or metal.

Figure 13:
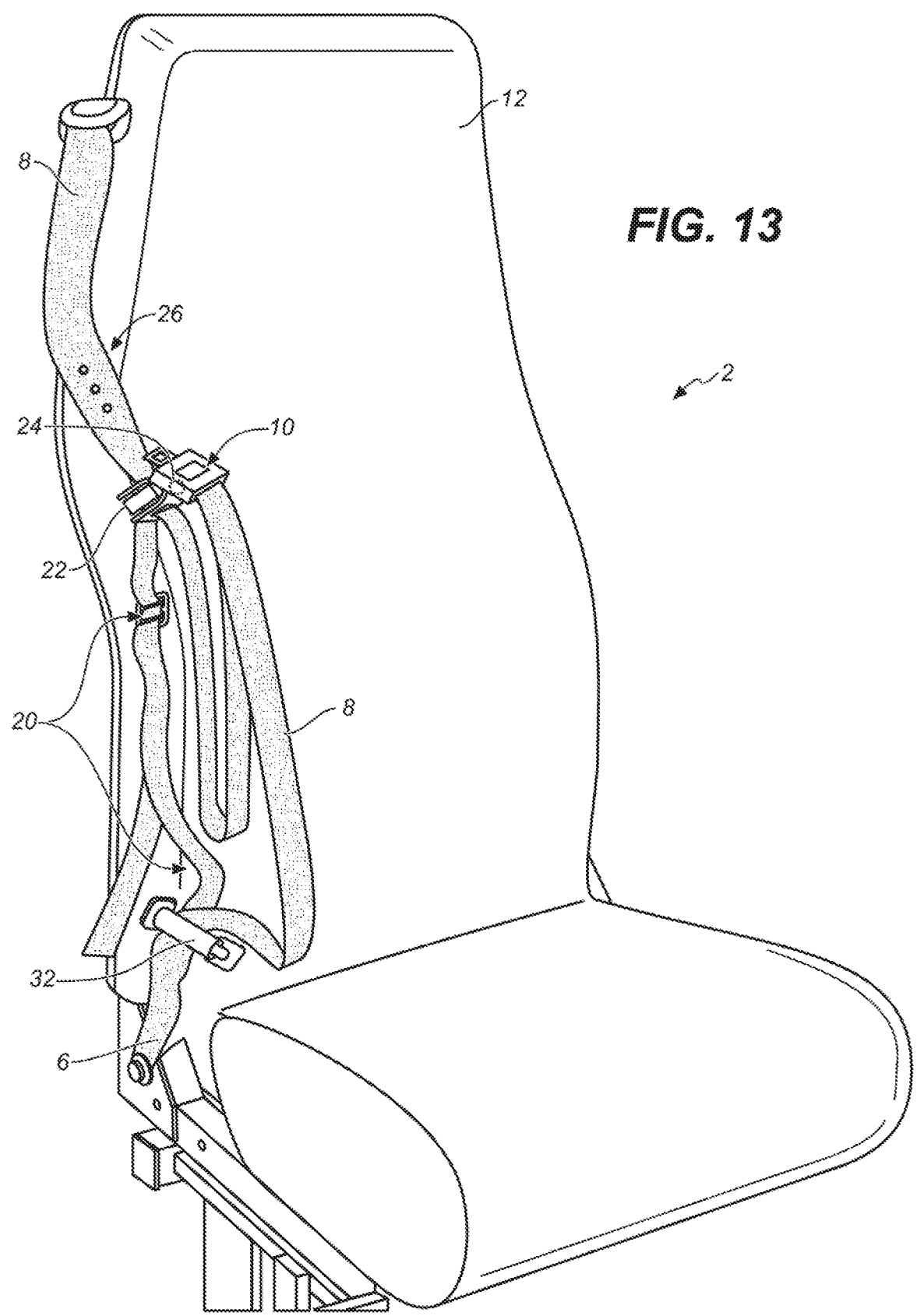
FIG. 13 is a schematic illustration of the vehicle safety seat belt latch being retained by the point of attachment buckle, according to the present invention.

A further unique aspect of the present invention is the addition of a magnet 24 or set of magnets 24 which can be attached to the upper and lower supplemental point of attachments 22 and 32, as they are invertible, along the inside of supplemental point of attachments 22 and 32. As will be described in greater detail later, as shown in FIG. 13, magnet 24 is used to retain existing vehicle safety belt latch or fastener 10 on upper supplemental point of attachment 22. In this manner, once the end user unbuckles the existing vehicle safety belt latch or fastener 10 from the buckle or other conventional vehicle safety belt latch or fastener attachment device (not shown), the end user simply attaches the existing vehicle safety belt latch or fastener 10 to the upper supplemental point of attachment 22 and the existing vehicle safety belt latch or fastener 10 is held in place on the upper supplemental point of attachment 22 by the magnet 24. This retention of the existing vehicle safety belt latch or fastener 10 by the upper supplemental point of attachment 22 will keep the existing vehicle safety belt straps 6, 8 and the latch or fastener 10 from being damaged by having someone close the vehicle door on the existing vehicle safety belt straps 6, 8 and the latch or fastener 10 and/or keep the existing vehicle safety belt straps 6, 8 and the latch or fastener 10 from being tangled with other existing vehicle safety belt straps 6, 8 located in the seat 12 near the supplemental device 2.

With respect to FIGS. 1 and 4-8, there are illustrated a second embodiment of strap extension 100 which includes upper and lower supplemental points of attachment 102 and 152. It is to be understood that upper and lower supplemental points of attachment 102 and 152 can be used in place of upper and lower supplemental points of attachment 22 and 32, respectively, as discussed above. As shown in FIGS. 4-8, upper and lower supplemental points of attachment 102 and 152 include, in part, base 52, arm 54, arm pivot 56, safety latch 58 and latch pivot 60. Preferably, upper and lower supplemental points of attachment 102 and 152 are constructed of any suitable, durable, lightweight material such as plastic or metal.

Figure 5:
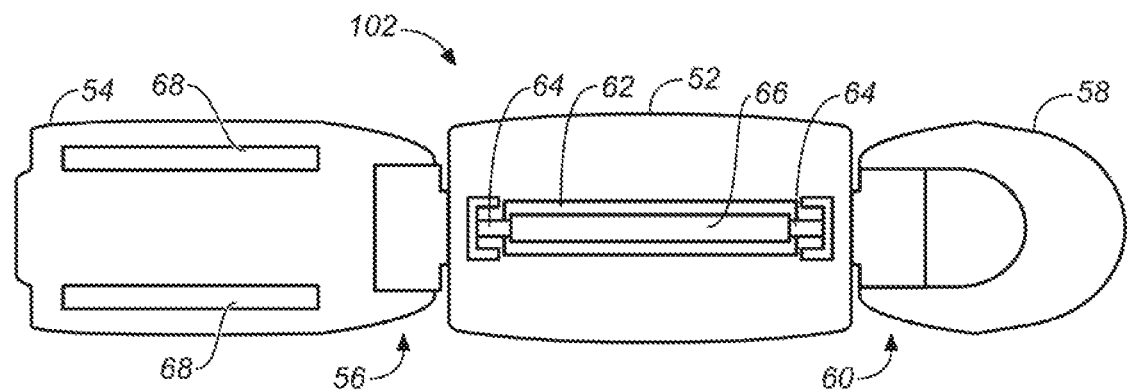
FIG. 5 is a schematic top view of the point of attachment buckle, constructed according to the second embodiment of the present invention.

As shown more clearly in FIG. 5, a slot 62 is located in base 52 of upper supplemental point of attachment 102 that allows a portion 66 of strap 40 to be retained within upper supplemental point of attachment 102 through the use of bar 64, as will be discussed in greater detail later. Also, magnets 68 can be located in arm 54 and used in the same manner as magnet 24 in supplemental point of attachments 22 and 32, as previously discussed.

Figure 6:
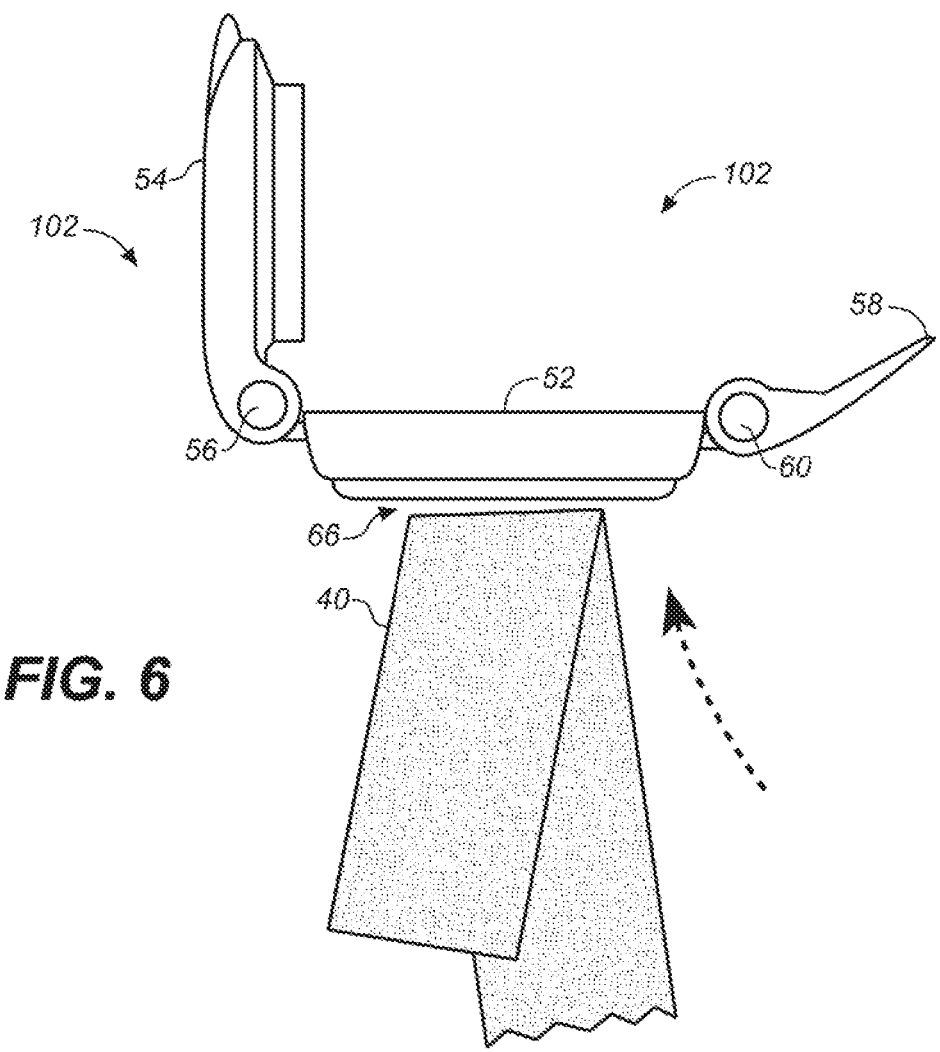
FIG. 6 is a schematic side view of the point of attachment buckle with one end of the strap extension being located adjacent to the point of attachment buckle, according to the second embodiment of the present invention.
Figure 7:
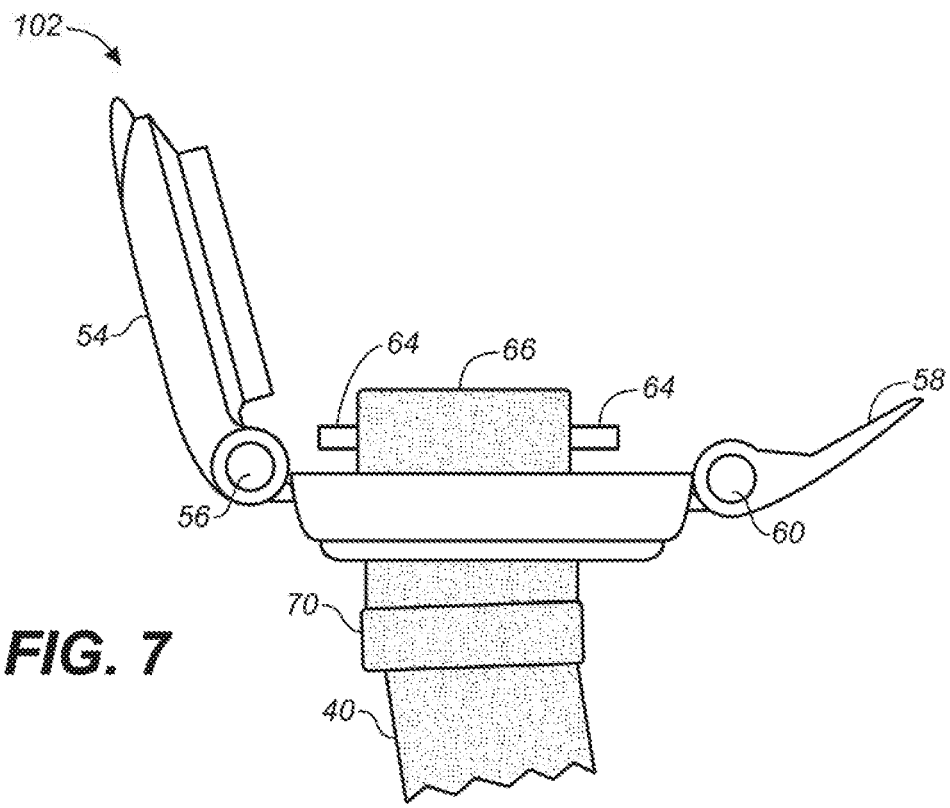
FIG. 7 is a schematic side view of the point of attachment buckle with one end of the strap extension being located inside of the point of attachment buckle and being retained by a retention bar, according to the second embodiment of the present invention.

In order to locate the portion 66 of strap 40 in slot 62 of upper supplemental point of attachment 102, as shown in FIGS. 6 and 7, the portion 66 of strap 40 is created by folding over strap 40 and then slid into slot 62. It is to be further understood that the end 70 (FIG. 7) of strap 40 is folded over in order to stop strap 40 from being inadvertently withdrawn or otherwise removed from upper supplemental point of attachment 102.

Once the portion 66 of strap 40 has been slid into slot 62, bar 64 is placed within the portion 66 of strap 40 (FIG. 7). The bar 64 is then locked into position on base 52 in order to retain strap 40 in upper supplemental point of attachment 102.

Figure 8:
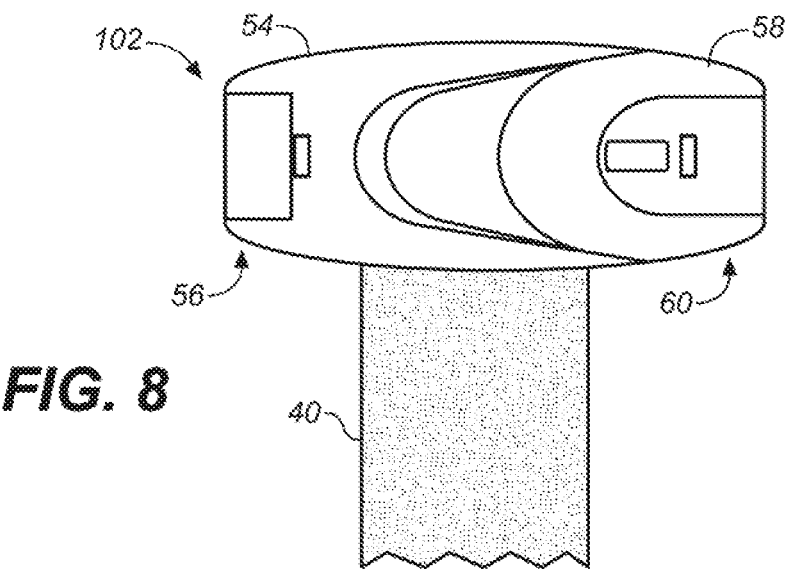
FIG. 8 is a schematic top view of the point of attachment buckle with one end of the strap extension being retained within the point of attachment buckle, according to the second embodiment of the present invention.
Figure 9:
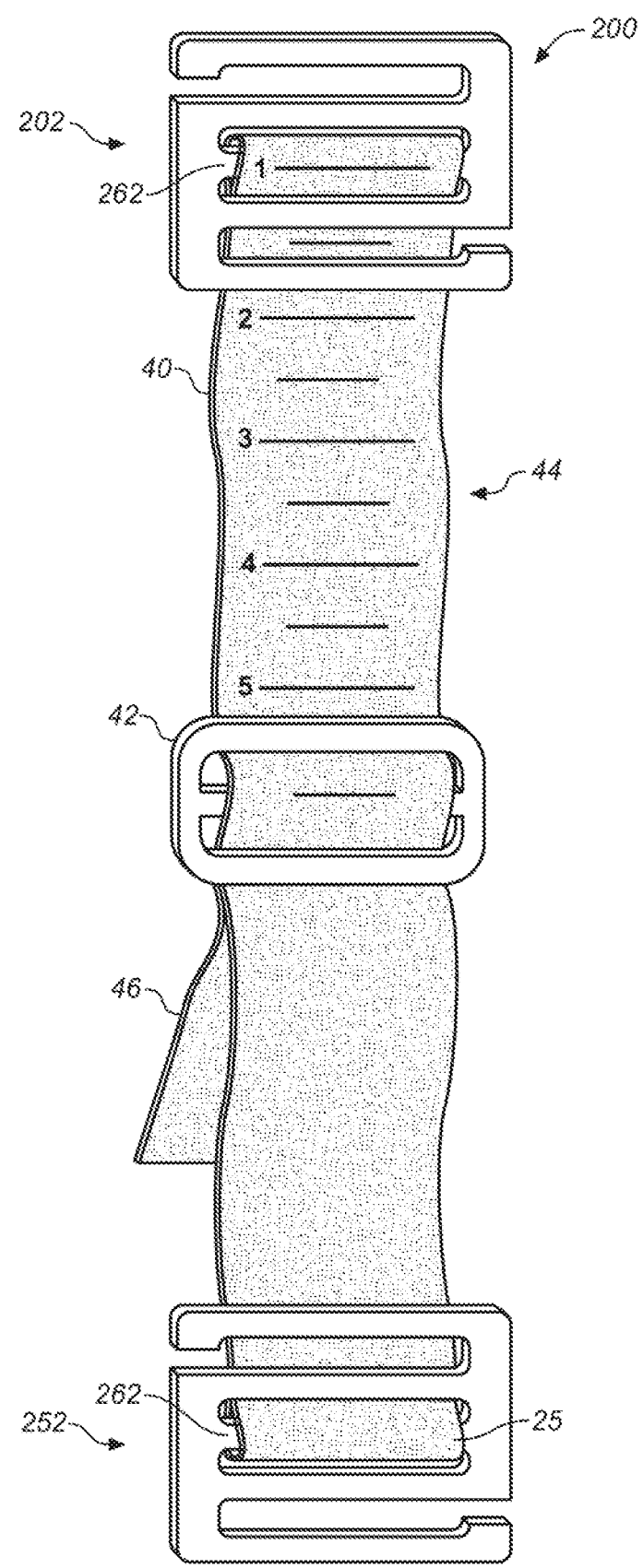
FIG. 9 is a schematic illustration of the supplemental device, constructed according to a third embodiment of the present invention.

After the bar 64 has been locked into position on base 52 in order to retain strap 40 in supplemental point of attachment 102, arm 54 is pivoted on pivot 56 so that arm 54 contacts portion 66 of strap 40. Safety latch 58 is then rotated on pivot 60 so that latch 58 latches to or otherwise retains arm 54 in place in relation to portion 66 of strap 40 to keep strap 40 from moving around in upper supplemental point of attachment 102 (FIG. 8). This latching of the latch 58 to arm 54 in order to keep strap 40 from moving around in upper supplemental point of attachment 102 is still another unique aspect of the present invention.

It is to be understood that in order to adjust the length of strap extension 40 using upper supplemental point of attachment 102 and lower supplemental point of attachment 152, strap adjuster 42 can be used with strap 40 in order to conventionally adjust a length of strap 40 by pulling on strap end 70. As previously discussed, after the end user has unlatched latch 58 of upper supplemental point of attachment 102, the end user 5 can simply hold onto strap adjuster 42 and pull on strap end 70 which causes a portion of strap 40 to move up and over the bar 64 of upper supplemental point of attachment 102 which, in turn, causes the length of strap 40 to be adjusted. Strap loop 25 is to be located over lower supplemental point of attachment 152 and retained in place by lower supplemental point of attachment 152, as previously discussed with respect to strap loop 25 and lower supplemental point of attachment 32.

With respect to FIGS. 9-12, there are illustrated a second embodiment of strap extension 200 which includes supplemental points of attachment 202 and 252. It is to be understood that strap extension 200 can be used in place of strap extension 20, as discussed above. Also, strap extension 200 includes strap 40, strap adjuster 42, strap adjustment indicia 44 and strap end 46. Furthermore, strap 40, strap adjuster 42, strap adjustment indicia 44 and strap end 46 are constructed in the same manner as strap 40, strap adjuster 42, strap adjustment indicia 44 and strap end 46 of strap extension 20, as previously discussed. It is to be further understood that upper supplemental points of attachment 202 can be conventionally equipped with a magnet (not shown) so that the existing vehicle safety belt latch or fastener 10 can be attached to the magnet(s) in supplemental point of attachment 202 in order to keep supplemental device 2 and existing vehicle safety belt 4 from getting damaged or tangled, as previously discussed. Also, strap loop 25 is conventionally formed on strap 40 by locating a portion of strap 40 around lower supplemental point of attachment 252 and sewing or otherwise permanently securing strap 40 to lower supplemental point of attachment 252 in order to permanently retain strap 40 on lower supplemental point of attachment 252. It is also to be understood that another strap adjuster 42 can be used instead of permanently attaching strap 40 to lower supplemental point of attachment 252. In this manner, a portion of strap 40 can be placed around center bar 262 of lower supplemental point of attachment 252 and pulled over center bar 262 of lower supplemental point of attachment 252. This portion of the strap 40 is then conventionally threaded through the second strap adjuster and retained by the second strap adjuster so that the lower end of strap 40 can also be adjusted.

As shown in FIGS. 9-12, strap extension 200 includes upper supplemental point of attachment 202 and lower supplemental point of attachment 252. Upper supplemental point of attachment 102 and lower supplemental point of attachment 152 are both constructed in the same manner except that upper supplemental point of attachment 202 is to be located adjacent to existing vehicle safety belt strap 8 and lower supplemental point of attachment 252 is to be located adjacent to existing vehicle safety belt strap 6 and upper supplemental point of attachment 202 maybe equipped with a magnet(s).

Regarding the construction of upper supplemental point of attachment 202 and lower supplemental point of attachment 252, each includes, in part, extensions 254, extension openings 256, connectors 258, connector openings 260 and center bar 262. Preferably, upper supplemental point of attachment 202 and lower supplemental point of attachment 252 are constructed of any suitable, durable, lightweight material such as metal or plastic.

Figures 10, 11:
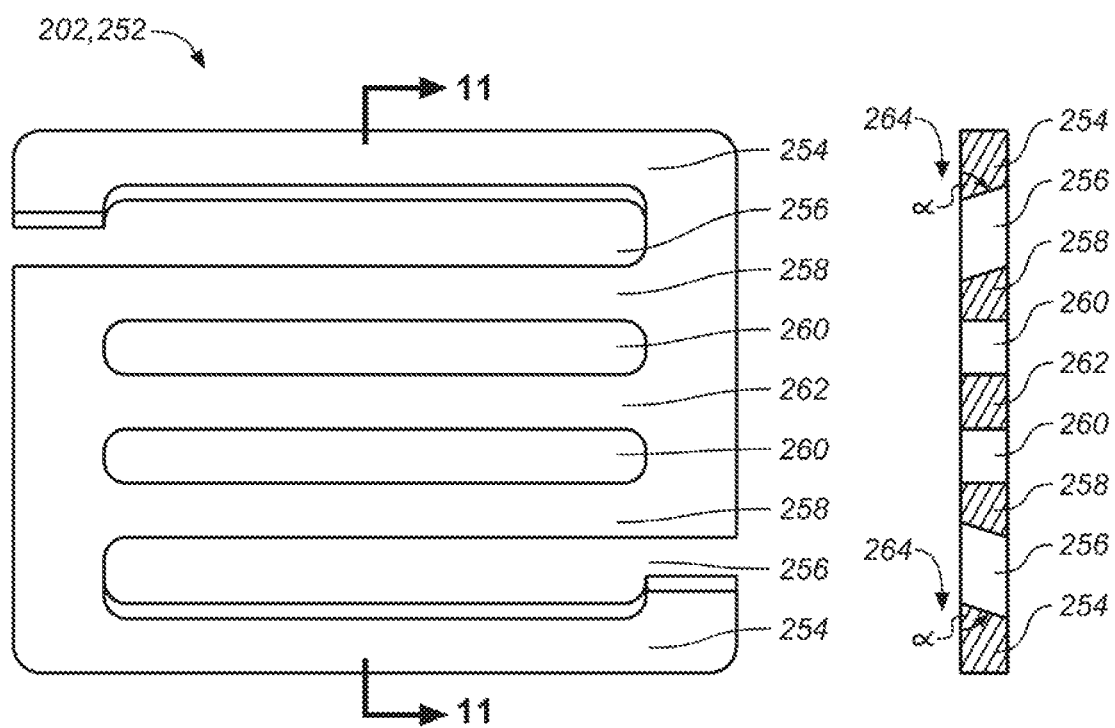
FIG. 10 is a schematic illustration of another point of attachment buckle, constructed according to the third embodiment of the present invention.
FIG. 11 is a side view of the another point of attachment buckle, taken along line 11-11 of FIG. 10, according to the present invention.
Figure 12:
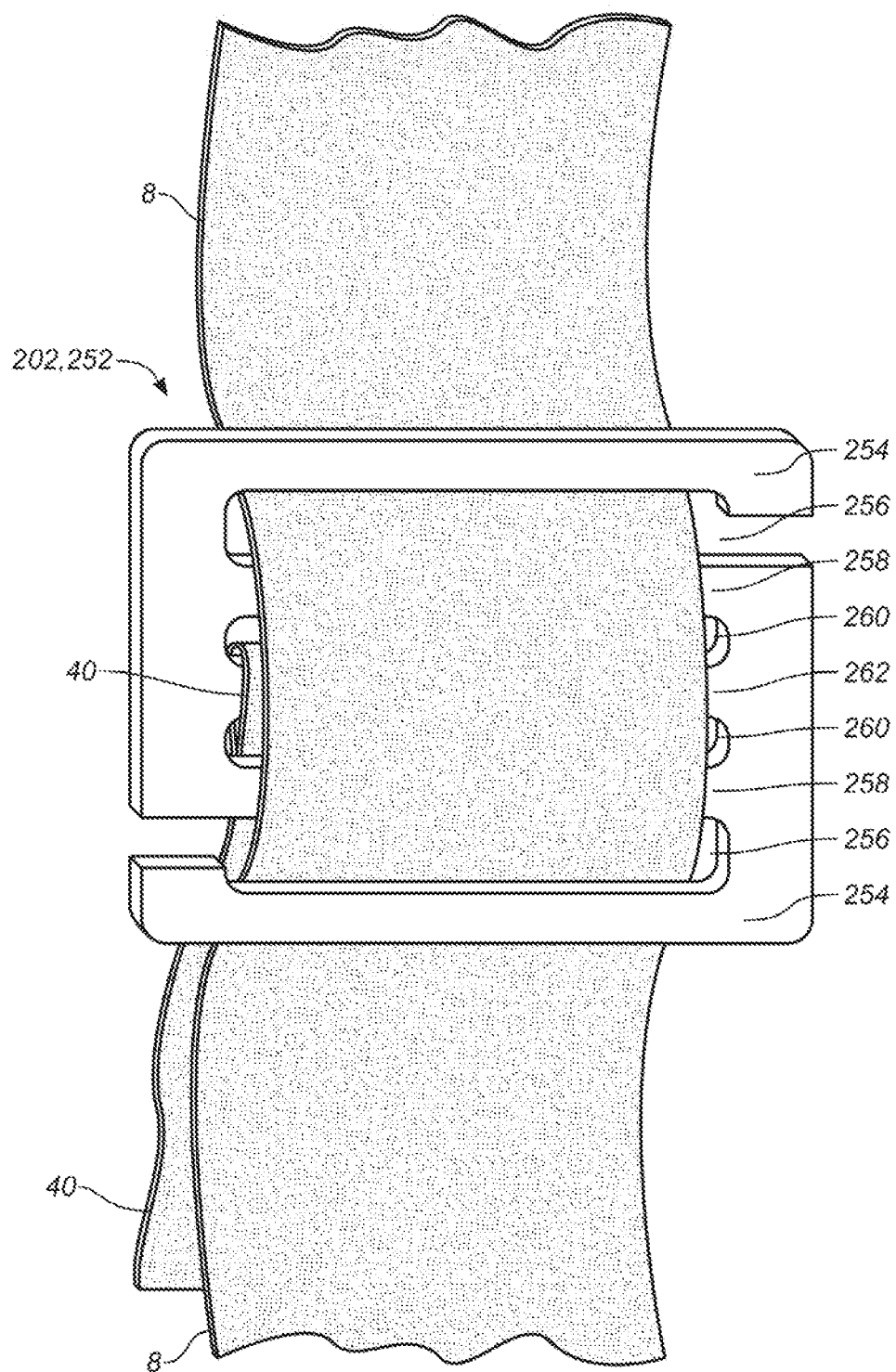
FIG. 12 is a schematic illustration of the another point of attachment buckle being located along the strap extension, according to the present invention.

A still further unique aspect of the present invention can be seen in FIGS. 11 and 12, where the angles (α) of extension openings 256 can be more easily seen. In this manner, the strap loop 25 is conventionally located around center bar 262 of lower supplemental point of attachment 252 such that strap 40 is retained by lower supplemental point of attachment 252. Portions of strap 40 are also located around center bar 262 of upper supplemental point of attachment 202 such that strap 40 is able to slide or move around center bar 262 of upper supplemental point of attachment 202. In this manner, the end user simply has to hold onto strap adjuster 42 and then pull on strap end 46 which will cause a portion of strap 40 to move up and over the center bar 262 of upper supplemental, point of attachment 202 which, in turn, causes the length of strap 40 to be adjusted.

In order to attach the existing vehicle safety belt straps 6, 8 to the upper supplemental point of attachment 202 and lower supplemental point of attachment 252, a portion of existing vehicle safety belt strap 8 is located in both of the extension openings 256 of upper supplemental point of attachment 202 and a portion of existing vehicle safety belt strap 6 is located in both of the extension openings 256 of lower supplemental point of attachment 252. The angles (α) of extension openings 256 of upper supplemental point of attachment 202 and lower supplemental point of attachment 252 prevent the upper supplemental point of attachment 202 and lower supplemental point of attachment 252 from sliding along existing vehicle safety belt straps 8, 6, respectively, since the existing vehicle safety belt straps 8, 6 interact with the edges 264 of extension openings 256 to create a friction stop between existing vehicle safety belt straps 8, 6 and edges 264.

During the operation of supplemental device 2 for use with an existing vehicle safety belt 4, reference is made to FIGS. 1-13. In particular, as discussed previously, the location of supplemental points of attachment 22, 32, 102, 152 and 202 and 252 is to be determined. For example, if supplemental points of attachment 22, 32 are being used, based upon the size of the person to be restrained by supplemental device 2 and existing vehicle safety belt 4, the end user simply determines the location of upper supplemental point of attachment 22 along existing vehicle safety belt strap 8. The end user then determines the location of lower supplemental point of attachment 32 along existing vehicle safety belt strap 6. As discussed above, the indicia 26 on existing vehicle safety belt strap 8 provide a means that allows the installer of the supplemental device 2 to remember the location of upper supplemental point of attachment 22 along existing vehicle safety belt strap 8. Also, the indicia 44 on strap extension 20 allow the installer of the supplemental device 2 for use with an existing vehicle safety belt 4 to remember the location of strap adjuster 42 along strap extension 20.

Once the length of the strap extension 20 has been determined, the location of upper supplemental point of attachment 22 has been determined and upper supplemental point of attachment 22 and lower supplemental point of attachment 32 have been securely attached in a parallel direction with respect to existing vehicle safety belt straps 8 and 6, respectively, the child to be restrained is then placed in the vehicle seat 12 so that the supplemental device 2 and existing vehicle safety belt 4 can be properly secured. In this manner, the adult removes the vehicle safety belt latch or fastener 10 from magnet 24 on upper supplemental point of attachment 22, pulls the vehicle safety belt latch or fastener 10 along with a portion of the existing vehicle safety belt straps 6, 8 across the body of the end user 5 and attaches the existing vehicle safety belt latch or fastener 10 into a buckle or other conventional attachment device (not shown) in order to assist in restraining the end user 5 in case of a vehicle accident or sudden stop.

An even further unique aspect of the present invention is the location of the supplemental device 2 with respect to the end user 5. As can be seen more clearly in FIG. 1, the supplemental device 2 is to be located behind and slightly beside the end user 5. Also, the upper supplemental point of attachment 22 is to be located behind and slightly above the shoulders of the end user 5. Furthermore, the lower supplemental point of attachment 32 should be located behind and away from hips of the end user 5, and as close to the seat cushion and the seat belt anchor 7, as possible, in order to prevent any unnecessary movement of the vehicle safety belt strap 6 above the end user's pelvis/hips and towards the abdomen of the end user 5. Most importantly, the lower supplemental point of attachment 32 must be attached as low as possible (close to the seat cushion) such that the lower supplemental point of attachment 32 does not alter the position of the vehicle safety belt strap 6, thereby allowing the vehicle safety belt strap 6 to properly rest on the hips/pelvis of the end user 5. Furthermore, by attaching the lower supplemental point of attachment 32 as close as possible to the seat cushion and seat belt anchor 7, less vertical movement of the lower supplemental point of attachment 32 is possible, which in turn reduces the amount of vertical movement of the upper supplemental point of attachment 22, thereby keeping vehicle safety belt strap 8 positioned, as initially intended/setup. In other words, by attaching the lower supplemental point of attachment 32 as close as possible to the seat cushion and seat belt anchor 7, this creates a steadier anchor for the present invention and does not allow the upper supplemental point of attachment 22 to be pulled up or allow the location of the upper supplemental point of attachment 22 to be changed from where it was initially attached. These locations of the supplemental device 2 and the upper supplemental point of attachment 22 and lower supplemental point of attachment 32 with respect to the end user 5 ensure that the supplemental device 2 will provide comfort and the proper amount of restraint and assist the existing vehicle safety belt 4 in restraining the end user 5 in case of a vehicle accident or sudden stop.

Upon arriving at the destination of the vehicle trip, the adult (or end user 5) then conventionally unlatches the existing vehicle safety belt latch or fastener 10 from the buckle or other conventional attachment device (not shown) and attaches the existing vehicle safety belt latch or fastener 10 to the magnet(s) 24 in upper supplemental point of attachment 22 in order to keep supplemental device 2 and existing vehicle safety belt 4 from getting damaged or tangled, as previously discussed.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the present invention and the present invention is not so limited.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Other modifications and implementations will occur to those skilled in the art without departing from the spirit and the scope of the invention. Accordingly, the description hereinabove is not intended to limit the invention.

Therefore, provided herein are new and improved supplemental devices for use with existing vehicle safety belts. The preferred supplemental devices for use with existing vehicle safety belts, according to various embodiments of the present invention, offers the following advantages: ease of use; lightness in weight; durability; improved safety belt characteristics; the ability to attach the loose end of the existing vehicle safety belt to the upper point of attachment so that the loose end of the existing safety belt is not damaged or does not become tangled with the other existing vehicle safety belts located in the vehicle; the use of buckles that can be removably secured to the existing vehicle safety belt; the use of a strap extension that includes markings or other indicia that allows the end user to easily adjust a length of the strap extension to a pre-determined length if the supplemental device has been adjusted for a different user or removed from the existing safety belt; the use of markings or other indicia on the existing vehicle safety belt that allow the end user to easily re-attach the points of attachment to the existing vehicle safety belt at a pre-determined location along the existing vehicle safety belt if the supplemental device has been removed from the existing vehicle safety belt; and the use of a unique strap extension retainer that securely retains the ends of the strap extension within the buckle. In fact, in many of the preferred embodiments, these advantages of ease of use, lightness in weight, durability, improved safety belt characteristics, the ability to attach the loose end of the existing vehicle safety belt to the upper point of attachment so that the loose end of the existing safety belt is not damaged or does not become tangled with the other existing vehicle safety belts located in the vehicle, the use of buckles that can be removably secured to the existing vehicle safety belt, the use of a strap extension that includes markings or other indicia that allows the end user to easily adjust a length of the strap extension to a pre-determined length if the supplemental device has been adjusted for a different user or removed from the existing safety belt, the use of markings or other indicia on the existing vehicle safety belt that allow the end user to easily re-attach the points of attachment to the existing vehicle safety belt at a pre-determined location along the existing vehicle safety belt if the supplemental device has been removed from the existing vehicle safety belt, and the use of a unique strap extension retainer that securely retains the ends of the strap extension within the buckle are optimized to an extent that is considerably higher than heretofore achieved in prior, known supplemental devices for use with existing vehicle safety belts.

We claim:

1. A supplemental safety belt system for use with a vehicle safety belt system, the vehicle safety belt system having an adjustable safety belt operatively connected to a vehicle seat such that a first end of the adjustable safety belt is operatively connected to a seat belt anchor located adjacent to a lower portion of the vehicle seat and a second end of the adjustable safety belt is adjustably connected to an upper portion of the vehicle seat, wherein a length of the second end of the adjustable safety belt can be adjusted and wherein a vehicle safety belt latch is located between the first and second ends of the adjustable safety belt such that the vehicle safety belt latch is capable of being operatively connected to a vehicle seat latch; the supplemental safety belt system comprising:
a supplemental safety belt device capable of being securely attached to the adjustable safety belt, wherein the supplemental device further comprises:
a strap extension having a first end and a second end;
a lower attachment device operatively connected to the first end of the strap extension such that the lower attachment device is capable of being securely attached to the adjustable safety belt at a location in close proximity to the seat belt anchor and an upper attachment device connected to the second end of the strap extension such that the upper attachment device is capable of being securely attached to the adjustable safety belt at a location adjacent to the upper portion of the vehicle seat, wherein the lower attachment device and the upper attachment device are located on the strap extension in an orientation that is substantially parallel to the adjustable safety belt and the lower attachment device and the upper attachment device allow the strap extension to be removed from the adjustable safety belt, wherein the lower and upper attachment devices are further comprised of:
a base having a first end and a second end, wherein the base includes a latch operatively connected to the second end of the base;
a pivot operatively connected to the first end of the base;
an upper latch device having a first end and a second end such that the first end of the upper latch is operatively connected to the pivot: and
a magnet located along a portion of the upper latch device, wherein the magnet is used to retain the vehicle safety belt latch on the upper attachment device; and
strap adjustment indicia located along a portion of the strap extension.

2. The supplemental device for use with a vehicle safety belt system, according to claim 1, wherein the adjustable safety belt is further comprised of:
vehicle safety belt indicia located along a length of the vehicle safety belt and adjacent to the second end of the adjustable safety belt.

3. The supplemental device for use with a vehicle safety belt system, according to claim 1, wherein the strap extension is further comprised of:
a strap adjuster operatively connected to the strap extension and located between the first and second ends of the strap extension.

4. The supplemental device for use with a vehicle safety belt system, according to claim 1, wherein the upper attachment device is further comprised of:
a slot located in the base; and
a bar located substantially within the slot.

5. A vehicle safety belt restraint system, comprising:
a vehicle safety belt system having an adjustable safety belt operatively connected to a vehicle seat such that a first end of the adjustable safety belt is operatively connected to a seat belt anchor located adjacent to a lower portion of the vehicle seat and a second end of the adjustable safety belt is adjustably connected to an upper portion of the vehicle seat, wherein a length of the second end of the adjustable safety belt can be adjusted and wherein a vehicle safety belt latch is located between the first and second ends of the adjustable safety belt such that the vehicle safety belt latch is capable of being operatively connected to a vehicle seat latch; and a supplemental device capable of being securely attached to the adjustable safety belt, wherein the supplemental device further comprises:
    a strap extension having a first end and a second end;
    a lower attachment device operatively connected to the first end of the strap extension such that the lower attachment device is capable of being securely attached to the adjustable safety belt at a location in close proximity to the seat belt anchor and an upper attachment device connected to the second end of the strap extension such that the upper attachment device is capable of being securely attached to the adjustable safety belt at a location adjacent to the upper portion of the vehicle seat, wherein the lower attachment device and the upper attachment device are located on the strap extension in an orientation that is substantially parallel to the adjustable safety belt and the lower attachment device and the upper attachment device allow the strap extension to be removed from the adjustable safety belt, wherein the lower and upper attachment devices are further comprised of:
        a base having a first end and a second end, wherein the base includes a latch operatively connected to the second end of the base;
        a pivot operatively connected to the first end of the base;
        an upper latch device having a first end and a second end such that the first end of the upper latch is operatively connected to the pivot; and
        a magnet located along a portion of the upper latch device, wherein the magnet is used to retain the vehicle safety belt latch on the upper attachment device; and
    strap adjustment indicia located along a portion of the strap extension.

6. The vehicle, safety belt restraint system, according to claim 5, wherein the adjustable safety belt is further comprised of:
    vehicle safety belt indicia located along a length of the vehicle safety belt and adjacent to the second end of the adjustable safety belt.

7. The vehicle safety belt restraint system, according to claim 5, wherein the strap extension is further comprised of:
    a strap adjuster operatively connected to the strap extension and located between the first and second ends of the strap extension.

8. The vehicle safety belt restraint system, according to claim 5, wherein the upper attachment device is further comprised of:
    a slot located in the base; and
    a bar located substantially within the slot.

9. A method of using a supplemental device with a vehicle safety belt system, comprising the steps of:
    providing a vehicle safety belt system having an adjustable safety belt operatively connected to a vehicle seat such that a first end of the adjustable safety belt is operatively connected to a seat belt anchor located adjacent to a lower portion of the vehicle seat and a second end of the adjustable safety belt is adjustably connected to an upper portion of the vehicle seat, wherein a length of the second end of the adjustable safety belt can be adjusted and wherein a vehicle safety belt latch is located between the first and second ends of the adjustable safety belt such that the vehicle safety belt latch is capable of being operatively connected to a vehicle seat latch; and
    providing a supplemental device capable of being securely attached to the adjustable safety belt, wherein the supplemental device further comprises:
        a strap extension having a first end and a second end;
        a lower attachment device operatively connected to the first end of the strap extension such that the lower attachment device is capable of being securely attached to the adjustable safety belt at a location in close proximity to the seat belt anchor and an upper attachment device connected to the second end of the strap extension such that the upper attachment device is capable of being securely attached to the adjustable safety belt at a location adjacent to the upper portion of the vehicle seat, wherein the lower attachment device and the upper attachment device are located on the strap extension in an orientation that is substantially parallel to the adjustable safety belt and the lower attachment device and the upper attachment device allow the strap extension to be removed from the adjustable safety belt, wherein the lower and upper attachment devices are further comprised of:
            a base having a first end and a second end, wherein the base includes a latch operatively connected to the second end of the base;
            a pivot operatively connected to the first end of the base;
            an upper latch device having a first end and a second end such that the first end of the upper latch is operatively connected to the pivot; and
            a magnet located along a portion of the upper latch device, wherein the magnet is used to retain the vehicle safety belt latch on the upper attachment device; and
        providing strap adjustment indicia located along a portion of the strap extension.

10. The method of using a supplemental device with a vehicle safety belt system, according to claim 9, wherein the step of providing an adjustable safety belt is further comprised of the step of:
    locating vehicle safety belt indicia along a length of the vehicle safety belt and adjacent to the second end of the adjustable safety belt.

11. The method of using a supplemental device with a vehicle safety belt system, according to claim 10, wherein the step, of providing a strap extension is further comprised of the step of:
    providing a strap adjuster that is operatively connected to the strap extension and located between the first and second ends of the strap extension.

12. The method of using a supplemental device with a vehicle safety belt system, according to claim 9, wherein the method is further comprised of the steps of:
    determining a location of the lower and upper attachment devices;
    locating the upper attachment device adjacent to the second end of the adjustable safety belt and the vehicle safety belt indicia;
    noting the location of the upper attachment device with respect to the vehicle safety belt indicia; and
    removably attaching the lower and upper attachment devices to the adjustable safety belt such that the lower and attachment device is located adjacent to the seat belt anchor.

13. The method of using a supplemental device with a vehicle safety belt system, according to claim 12, wherein the method is further comprised of the steps of:

adjusting the strap extension to a desired length of the strap extension through the use of the strap adjuster;

noting a location of the strap adjuster along the strap extension with respect to the strap adjustment indicia; and removably attaching the vehicle safety belt latch to the vehicle seat latch.

14. The method of using a supplemental device with a vehicle safety belt system, according to claim 13, wherein the method is further comprised of the steps of:

removing the vehicle safety belt latch from the vehicle seat latch; and removably attaching the vehicle safety belt latch to the magnet located along a portion of the upper latch device in order to keep the strap extension, the upper and lower attachment devices and the adjustable safety belt from getting damaged or tangled.

\* \* \* \* \*